I. VAN DER STRAETEN.
TROLLEY HEAD.
APPLICATION FILED MAY 24, 1920.

1,393,254. Patented Oct. 11, 1921.

Inventor:
Ivan Van der Straeten
By Lawrence Langner
Attorney.

UNITED STATES PATENT OFFICE.

IVAN VAN DER STRAETEN, OF LIEGE, BELGIUM.

TROLLEY-HEAD.

1,393,254.  Specification of Letters Patent.  Patented Oct. 11, 1921.

Application filed May 24, 1920. Serial No. 383,878.

*To all whom it may concern:*

Be it known that I, IVAN VAN DER STRAETEN, engineer, a subject of the King of Belgium, and resident of Liege, in the Kingdom of Belgium, have invented certain new and useful Improvements in Trolley-Heads, for which I have filed an application in Belgium, November 16, 1916; and I do hereby declare the following to be a full, clear, and exact description of the invention, such as will enable others skilled in the art to which it appertains to make and use the same, reference being had to the accompanying drawings, and to letters or figures of reference marked therein, which form a part of this specification.

The invention relates to a trolley head comprising a fixed member, a rotatable pulley carrying member adapted to oscillate about its axis from normal position, and resilient means for returning said rotatable member to normal position when displaced therefrom.

According to the invention during displacement of the rotatable member the point of connection of the resilient means with the rotatable member varies according to the direction of angular displacement of the latter.

In carrying out the invention, a resilient connection is provided comprising a pair of relatively slidable members and an interposed spring. This resilient connection is pivotally connected at one end to the fixed member and is provided at its other end with a pair of slots. A member fixed to the rotatable member is provided with a pair of abutments engaging in said slots.

In the normal position of said rotatable member both abutments are in operative engagement with the end walls of said slots but when said rotatable member rotates in either direction from normal position only one of the abutments remains in engagement with the end wall of its slot, the other abutment merely sliding in its slot.

One of the various possible embodiments of the invention is shown by way of example in the accompanying drawings.

Figure 1:
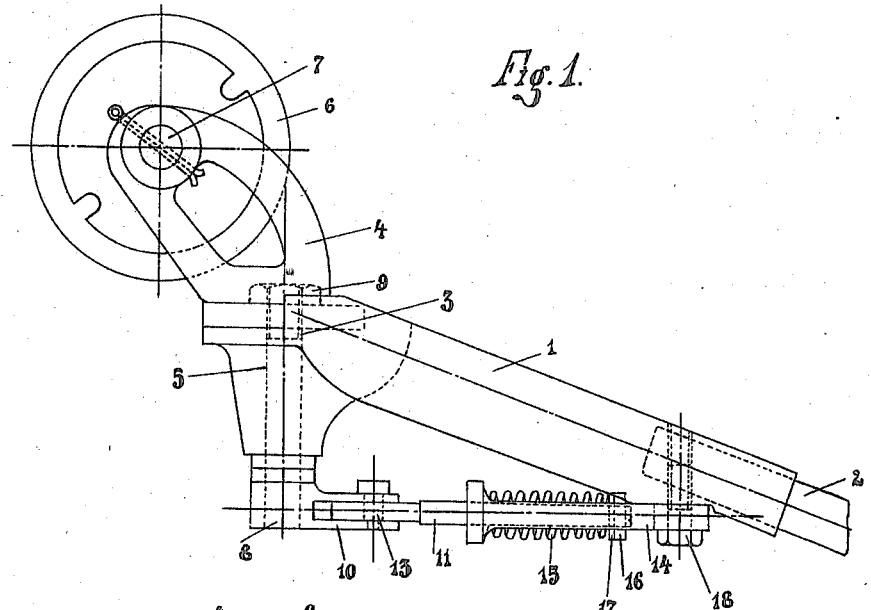
Figure 1 is a side elevation of the trolley-head.
Figure 2:
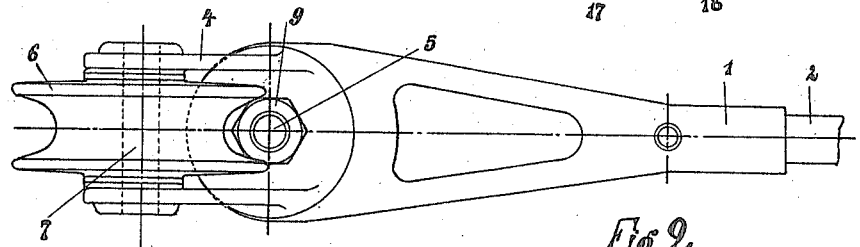
Fig. 2 is a plan view.
Figure 3:
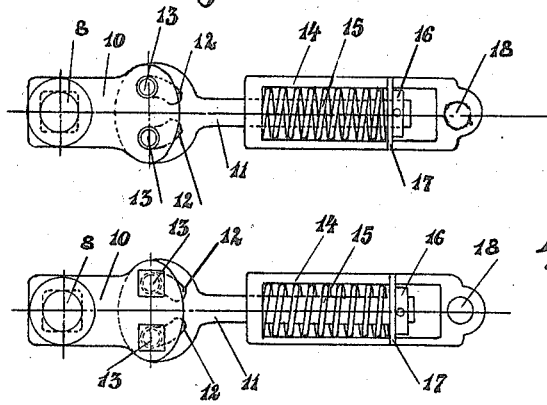
Figs. 3 and 4 are detail views of the return-arrangement.
Figure 4:
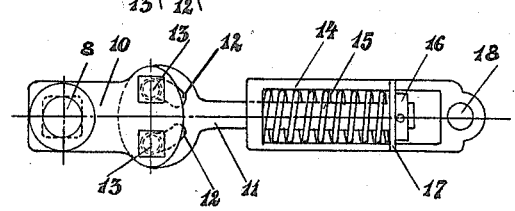

In Figs. 1 to 4, the trolley-head comprises a fixed portion 1 secured to the trolley rod or support 2.

Said fixed portion is provided with an even or faced portion 3 whereupon the movable portion 4 of the trolley-head is supported. The movable portion 4 is capable of rotating about an axis 5 and has the shape of a fork wherein the pulley 6 is embraced and rotates about an axis 7.

The pivot pin 5 is provided with a square portion 8 at its lower end; at the upper end there is screwed a nut 9 which assists in joining together the movable portion and the fixed portion of the trolley-head.

A fork-shaped piece 10 is connected to the square portion 8. Between the branches of said fork there is inserted a piece 11 provided with two slots 12, in which pass freely the assembling pivots 13.

Each slot 12 is shaped as an arc of a circle the radius of which is the distance between the two pivots 13.

The piece 11 is engaged in a frame 14 to which it is joined by the interposition of a spiral spring and a screw-nut 16. Between said spring and said nut there is inserted a sliding member 17 for guiding the movement of the piece 11 in the frame 14.

Said frame 14 is also pivotally mounted at 18 on the fixed portion of the trolley-head. The pivot pin 18 is also used for securing the trolley-head to the rod or support 2.

When the aerial conductor is in straight alinement, it remains at the bottom of the groove of the pulley; on the contrary, when in a curve, said wire is wedged between the flanges of the pulley; the result is a considerable wear of the pulley and of the aerial conductor and besides the pulley has a tendency to escape from the wire.

With the arrangement hereinbefore described, as soon as the pulley is engaged on a curved portion of the aerial wire, the movable portion 4 rotates with the axis 5 so as to hold the wire at the bottom of the groove, which is the normal position causing little wear and insuring good contact.

As soon as the vehicle is again engaged in a straight portion of the track, the return-spring 15 operates for drawing back the pulley in the normal position. The tension of the spring 15 can be adjusted at will by screwing up the nut 16.

The function of the two slots 12 is to render said return movement possible as well in a left hand as in a right hand deviation of the movable portion 4.

What I claim is:—

1. A trolley head comprising a fixed member, a member rotatable thereon, a pulley carried by said rotatable member, and resilient means connecting said fixed and rotatable members adapted to return said rotatable member to normal position when displaced therefrom, the point of connection of said resilient means with said rotatable member varying according to the direction of angular displacement of the latter.

2. A trolley head comprising a fixed member, a rotatable pulley carrying member, and resilient means connecting said fixed and rotatable members adapted to return said rotatable member to normal position when displaced therefrom, said means comprising a part fixed to said rotatable member for rotary movement therewith, a part pivotally connected to said fixed member, and an operative connection between said parts comprising a pair of abutments carried by one of said parts, both of said abutments engaging the other of said parts when said rotatable member is in normal position and one or the other of said abutments only engaging said part when said rotatable member is rotated in either direction from normal position.

In testimony whereof I affix my signature in presence of two witnesses.

I. VAN der STRAETEN.

Witnesses:
WM. HEPBIA,
J. LEONARD.